United States Patent

(12) United States Patent
Xu et al.

(10) Patent No.: US 12,457,082 B2
(45) Date of Patent: Oct. 28, 2025

(54) MONITORING FOR A COMBINATION DOWNLINK CONTROL INFORMATION (DCI) FOR SCHEDULING TRANSMISSIONS IN MULTIPLE CELLS

(71) Applicant: QUALCOMM Incorporated, San Diego, CA (US)

(72) Inventors: Huilin Xu, Temecula, CA (US); Yuwei Ren, Beijing (CN); Ruifeng Ma, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 530 days.

(21) Appl. No.: 17/758,941

(22) PCT Filed: Jan. 16, 2020

(86) PCT No.: PCT/CN2020/072432
§ 371 (c)(1),
(2) Date: Jul. 15, 2022

(87) PCT Pub. No.: WO2021/142704
PCT Pub. Date: Jul. 22, 2021

(65) Prior Publication Data
US 2023/0040333 A1  Feb. 9, 2023

(51) Int. Cl.
*H04L 5/00* (2006.01)
*H04L 25/02* (2006.01)
*H04W 72/23* (2023.01)

(52) U.S. Cl.
CPC ............ *H04L 5/0053* (2013.01); *H04L 5/001* (2013.01); *H04L 25/0238* (2013.01); *H04W 72/23* (2023.01)

(58) Field of Classification Search
CPC ... H04L 5/0053; H04L 5/001; H04L 25/0238; H04L 5/0048; H04W 72/23
See application file for complete search history.

(56) References Cited

U.S. PATENT DOCUMENTS

2015/0195069 A1  7/2015  Yi et al.
2017/0013563 A1  1/2017  Yang et al.
(Continued)

FOREIGN PATENT DOCUMENTS

CN  108352952 A  7/2018
EP     3247061 A1  11/2017

OTHER PUBLICATIONS

3GPP TSG RAN WG1 #96, Samsung, Cross-carrier Scheduling with Different Numerologies (Year: 2019).*
(Continued)

*Primary Examiner* — Candal Elpenord
*Assistant Examiner* — Bradley D Lytle, Jr.
(74) *Attorney, Agent, or Firm* — Patterson & Sheridan, L.L.P/Qualcomm Incorporated

(57) ABSTRACT

Certain aspects of the present disclosure provide techniques that may for configuration of parameters for monitoring for a combination downlink control information (DCI) that schedules data and/or reference signal transmissions in multiple cells. An example method generally includes determining, a blind decode (BD) limit and a control channel element (CCE) limit based on a scaling factor less than one, determining physical downlink control channel (PDCCH) parameters based on the BD limit and the CCE limit for monitoring for a combination downlink control information (DCI) that schedules at least one of data or reference signal (RS) transmissions in multiple cells, and monitoring for the combination DCI based on the determined PDCCH parameters.

23 Claims, 9 Drawing Sheets

(56) References Cited

U.S. PATENT DOCUMENTS

| | | |
|---|---|---|
| 2017/0013565 A1 | 1/2017 | Pelletier et al. |
| 2017/0374653 A1 | 12/2017 | Lee et al. |
| 2019/0313321 A1 | 10/2019 | Xu et al. |
| 2019/0327693 A1* | 10/2019 | Rahman ............... H04W 52/42 |
| 2019/0334681 A1 | 10/2019 | Xu et al. |
| 2019/0349155 A1 | 11/2019 | Xu et al. |
| 2021/0045042 A1* | 2/2021 | Nakashima ........... H04L 5/0094 |
| 2022/0150734 A1* | 5/2022 | Nimbalker ........... H04L 1/0038 |

OTHER PUBLICATIONS

3GPP TSG RAN WG1 #96 R1-1902251 Mar. 2019 (Year: 2019).*

Ericsson: "Cross-carrier Scheduling with Different Numerologies", 3GPP TSG-RAN WG1 Meeting 96, R1-1902944, 3rd Generation Partnership Project (3GPP), Mobile Competence Centre, 650, Route Des Lucioles, F-06921, Sophia-Antipolis Cedex, France, vol. RAN WG1, No. Athens, Greece, Feb. 25, 2019-Mar. 1, 2019, Feb. 16, 2019, 5 Pages, XP051600642, Section 2.2, Figure 1.

Ericsson: "New WID on NR Dynamic Spectrum Sharing (DSS)", 3GPP TSG RAN Meeting #86, RP-193260, 3rd Generation Partnership Project, Mobile Competence Centre, 650, Route Des Lucioles, F-06921, Sophia-Antipolis Cedex, France, vol. TSG RAN, No. Sitges, Spain, Dec. 9, 2019-Dec. 12, 2019, Dec. 12, 2019, XP051840390, 4 Pages, Section 4.1, paragraph [04.1].

Fiber Home: "Discussion on the False Detection Problem in Rel-13 eCA", 3GPP TSG RAN WG1 Meeting #82, R1-154495, 3rd Generation Partnership Project (3GPP), Mobile Competence Centre, 650, Route Des Lucioles, F-06921, Sophia-Antipolis Cedex, France, vol. RAN WG1, No. Beijing, China, Aug. 24, 2015-Aug. 28, 2015, Aug. 23, 2015, 3 Pages, XP051001767, Section 2.2.

Huawei, et al., "Discussion on NR CA for Cross-Carrier Scheduling with Different Numerologies," 3GPP Draft, 3GPP TSG RAN WG1 Meeting #96, R1-1901580, 3rd Generation Partnership Project (3GPP), Mobile Competence Centre, 650, Route Des Lucioles, F-06921, Sophia-Antipolis Cedex, France, vol. RAN WG1, No. Athens, Greece; Feb. 25, 2019-Mar. 1, 2019, Feb. 16, 2019, (Feb. 16, 2019), XP051599277, 15 pages, figures 9-10, sections 2-5.

Huawei, et al., "Views on Rel-17 Package", 3GPP Draft, 3GPP TSG RAN Meeting #86, RP-193098, 3rd Generation Partnership Project (3GPP), Mobile Competence Centre, 650, Route Des Lucioles, F-06921 Sophia-Antipolis Cedex, France, vol. TSG RAN, No. Sitges, Spain, Dec. 9, 2019-Dec. 12, 2019, Dec. 10, 2019, (Dec. 10, 2019), XP051838813, 9 Pages, The Whole Document.

NTT Docomo et al: "Cross-Carrier Scheduling with Different Numerologies", 3GPP TSG RAN WG1 #96, R1-1902819, 3rd Generation Partnership Project (3GPP), Mobile Competence Centre, 650, Route Des Lucioles, F-06921, Sophia-Antipolis Cedex, France, vol. RAN WG1, No. Athens, Greece, Feb. 25, 2019-Mar. 1, 2019, Feb. 16, 2019, pp. 1-4, XP051600514, Section 2.1, Figure 1.

Samsung: "Cross-Carrier Scheduling with Different Numerologies", 3GPP TSG RAN WG1 #96, R1-1902251, 3rd Generation Partnership Project (3GPP), Mobile Competence Centre, 650, Route Des Lucioles, F-06921, Sophia-Antipolis Cedex, France, vol. RAN WG1, No. Athens, Greece, Feb. 25, 2019-Mar. 1, 2019, Feb. 15, 2019, pp. 1-5, XP051599946, Sections 2.3 and 2.4, Figure 2.

Samsung: "Remaining Scheduling Aspects for CA Operation", 3GPP TSG RAN WG1 Meeting NR#3, R1-1716022, 3rd Generation Partnership Project (3GPP), Mobile Competence Centre, 650, Route Des Lucioles, F-06921, Sophia-Antipolis Cedex, France, vol. RAN WG1, No. Nagoya, Japan, Sep. 18, 2017-Sep. 25, 2017, Sep. 17, 2017, pp. 1-3, XP051339481, Section 2.

Supplementary European Search Report—EP20913387—Search Authority—The Hague—Aug. 29, 2023.

Vivo: "Cross-Carrier Scheduling with Different Numerologies", 3GPP Draft; R1-1901720 Cross-Carrier Scheduling with different Numerologies, 3rd Generation Partnership Project (3GPP), Mobile Competence Centre, 650, Route Des Lucioles ; F-06921 Sophia-Antipolis Cedex, France, vol. RAN WG1, No. Athens, Greece; Feb. 25, 2019-Mar. 1, 2019 Feb. 16, 2019, XP051599416, Sect.s 2.4 and 2.5, 8 pages.

International Search Report/ Written Opinion issued to PCT/CN2020/072432 on Sep. 17, 2020.

Samsung: "Cross-Carrier Scheduling with Different Numerologies", 3GPP TSG RAN WG1 #96, R1-1902251, 3rd Generation Partnership Project (3GPP), Mobile Competence Centre, 650, Route Des Lucioles, F-06921, Sophia-Antipolis Cedex, France, vol. RAN WG1, No. Athens, Greece, Feb. 25, 2019-Mar. 1, 2019, pp. 1-5, Mar. 1, 2019.

* cited by examiner

MONITORING FOR A COMBINATION DOWNLINK CONTROL INFORMATION (DCI) FOR SCHEDULING TRANSMISSIONS IN MULTIPLE CELLS

This application is a national stage application under 35 U.S.C. 371 of PCT/CN2020/072432, filed Jan. 16, 2020, which is assigned to the assignee hereof, and hereby expressly incorporated by reference herein in its entirety as if fully set forth below and for all applicable purposes.

TECHNICAL FIELD

Aspects of the present disclosure relate to wireless communications, and more particularly, to techniques for monitoring for information for scheduling transmissions in multiple cells.

INTRODUCTION

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, further improvements in NR and LTE technology continue to be useful. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide a method for wireless communication by a user equipment (UE). The method generally includes determining, a blind decode (BD) limit and a control channel element (CCE) limit based on a scaling factor less than one, determining physical downlink control channel (PDCCH) parameters based on the BD limit and the CCE limit for monitoring for a combination downlink control information (DCI) that schedules at least one of data or reference signal (RS) transmissions in multiple cells, and monitoring for the combination DCI based on the determined PDCCH parameters.

Certain aspects provide a method for wireless communication performed by a network entity. The method generally includes determining, a blind decode (BD) limit and a control channel element (CCE) limit based on a scaling factor less than one, determining physical downlink control channel (PDCCH) parameters based on the BD limit and the CCE limit for a user equipment (UE) to monitor a combination downlink control information (DCI) that schedules at least one of data or reference signal (RS) transmissions in multiple cells, and transmitting, to the UE, the combination DCI based on the determined PDCCH parameters Aspects of the present disclosure provide means for, apparatus, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
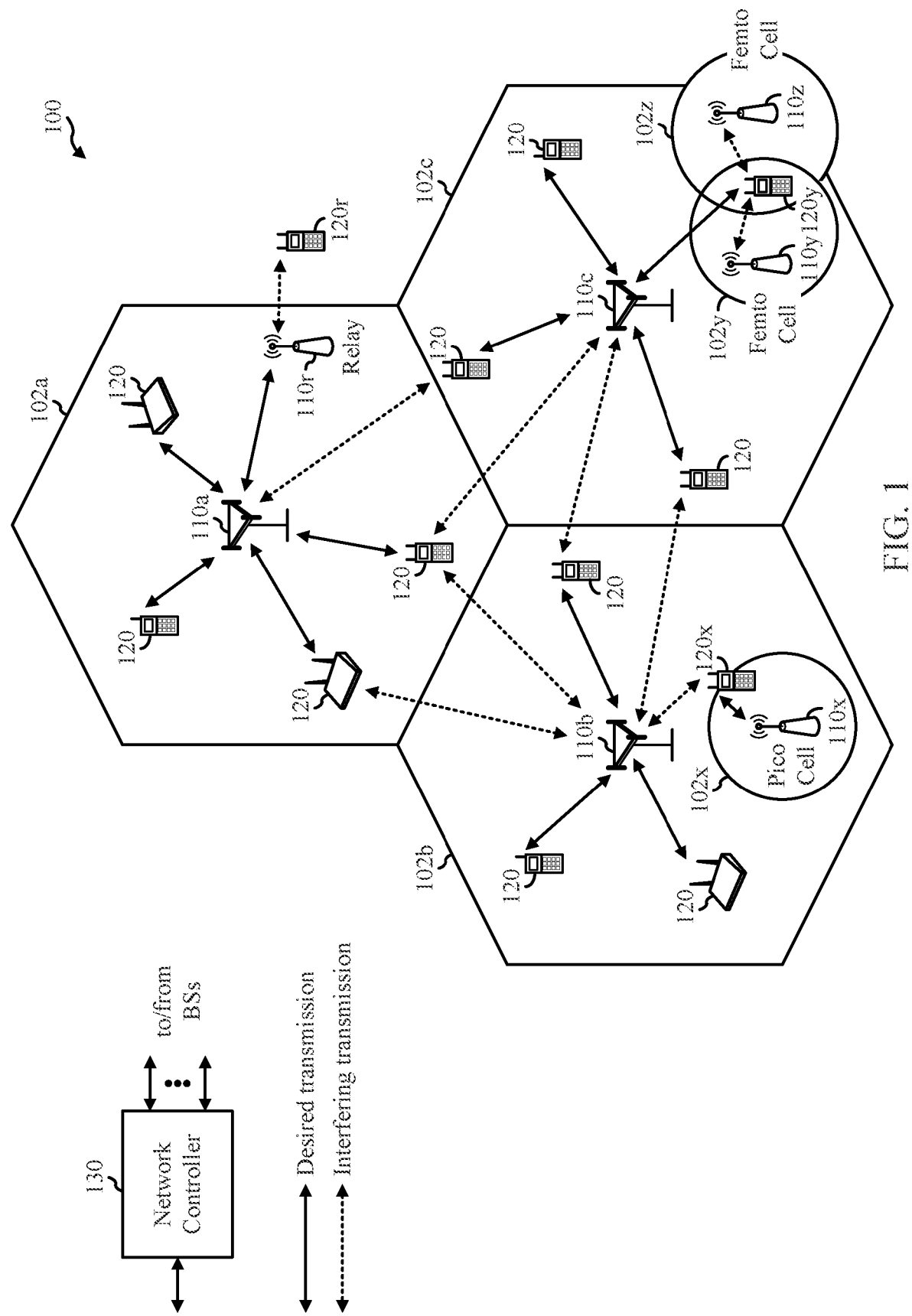
FIG. 1 is a block diagram conceptually illustrating an example telecommunications system, in accordance with certain aspects of the present disclosure.

Aspects of the present disclosure provide apparatus, devices, methods, processing systems, and computer readable mediums for monitoring for a combination downlink control information (DCI) that schedules transmissions in multiple cells.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), Institute of Electrical and Electronics Engineers (IEEE) 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 (e.g., an NR/5G network), in which aspects of the present disclosure may be performed. For example, the wireless network 100 may include a UE 120 configured to perform operations 800 of FIG. 8 to monitor for a combination downlink control information (DCI) that schedules transmissions for multiple cells. Similarly, a base station 110 (e.g., a gNB) may be configured to perform operations 900 of FIG. 9 to transmit a combination downlink control information (DCI) that schedules transmissions for multiple cells.

As illustrated in FIG. 1, the wireless network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a NodeB (NB) and/or a NodeB subsystem serving this coverage area, depending on the context in which the term is used. In NR systems, the term "cell" and next generation NodeB (gNB), new radio base station (NR BS), 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area to avoid interference between wireless networks of different RATs. In some cases, NR or 5G RAT networks may be deployed.

A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r to facilitate communication between the BS 110a and the UE 120r. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, gaming device, reality augmentation device (augmented reality (AR), extended reality (XR), or virtual reality (VR)), or any other suitable device that is configured to communicate via a wireless or wired medium.

Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time-division duplexing (TDD). Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some scenarios, air interface access may be scheduled. For example, a scheduling entity (e.g., a base station (BS), Node B, eNB, gNB, or the like) can allocate resources for communication among some or all devices and equipment within its service area or cell. The scheduling entity may be responsible for scheduling, assigning, reconfiguring, and releasing resources for one or more subordinate entities. That is, for scheduled communication, subordinate entities can utilize resources allocated by one or more scheduling entities.

Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

Turning back to FIG. 1, this figure illustrates a variety of potential deployments for various deployment scenarios. For example, in FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS. Other lines show component to component (e.g., UE to UE) communication options.

Figure 2:
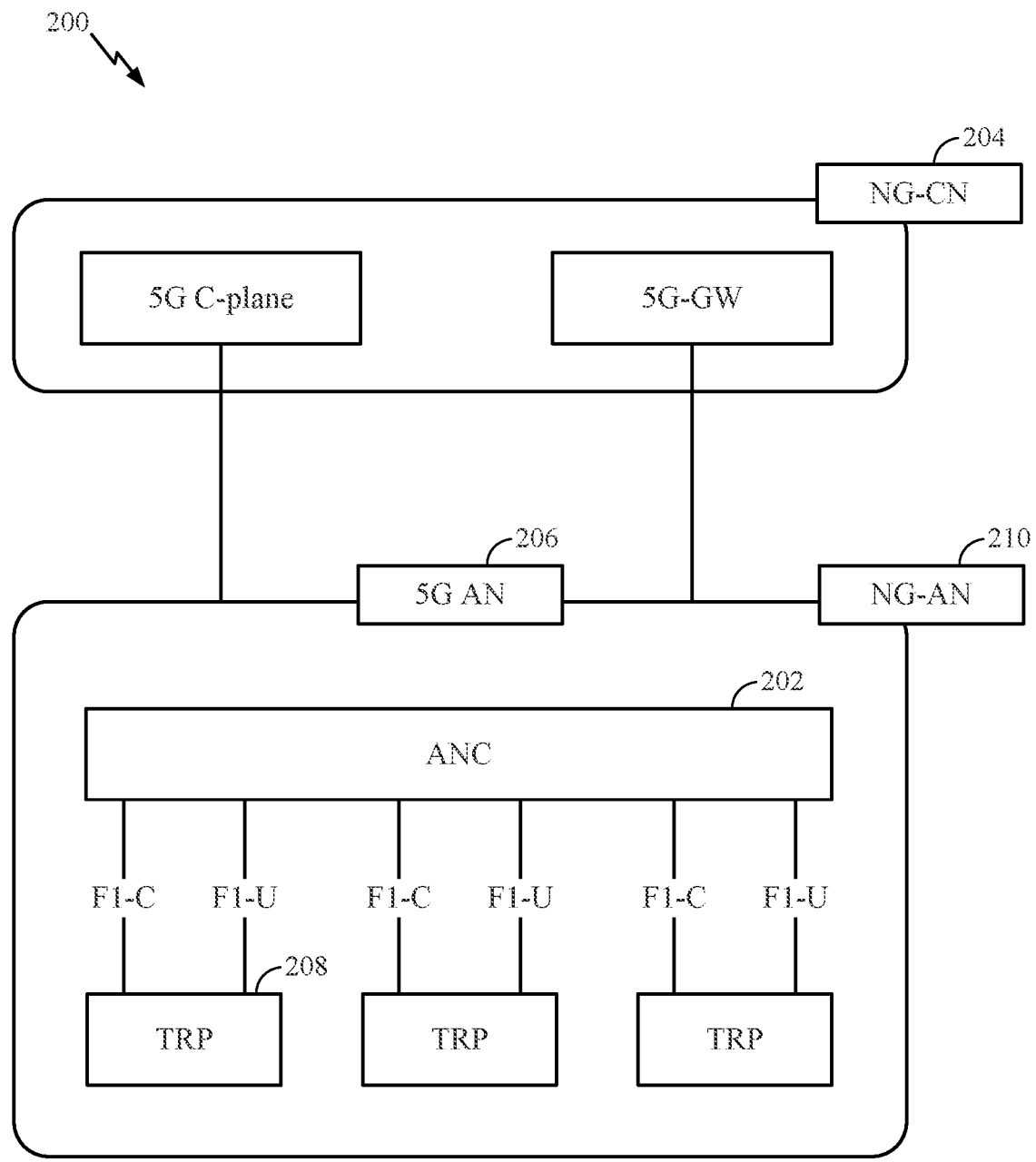
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more transmission reception points (TRPs) 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific ANC deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support various backhauling and fronthauling solutions. This support may occur via and across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
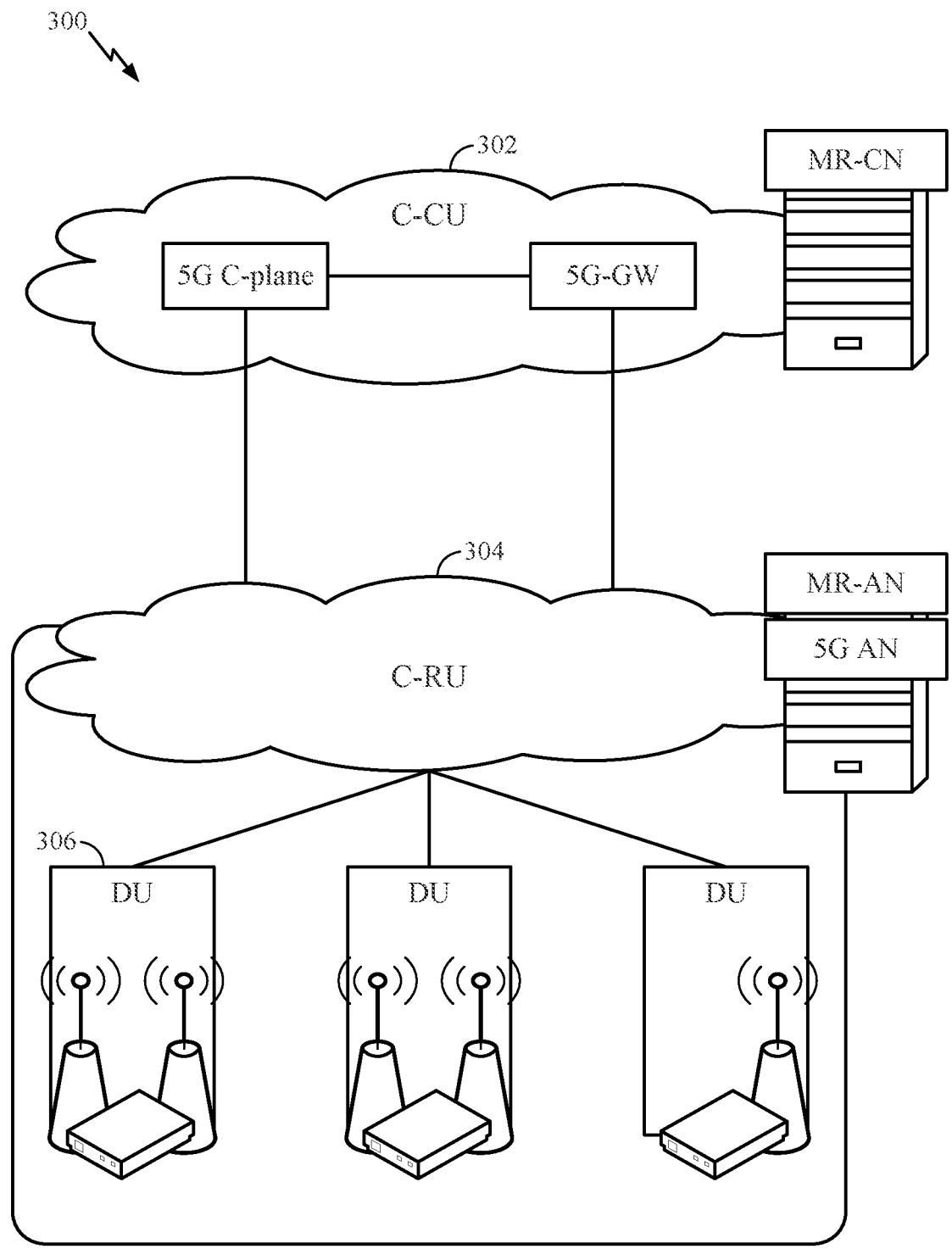
FIG. 3 is a diagram illustrating an example physical architecture of a distributed RAN, in accordance with certain aspects of the present disclosure.

FIG. 3 illustrates an example physical architecture of a distributed Radio Access Network (RAN) 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
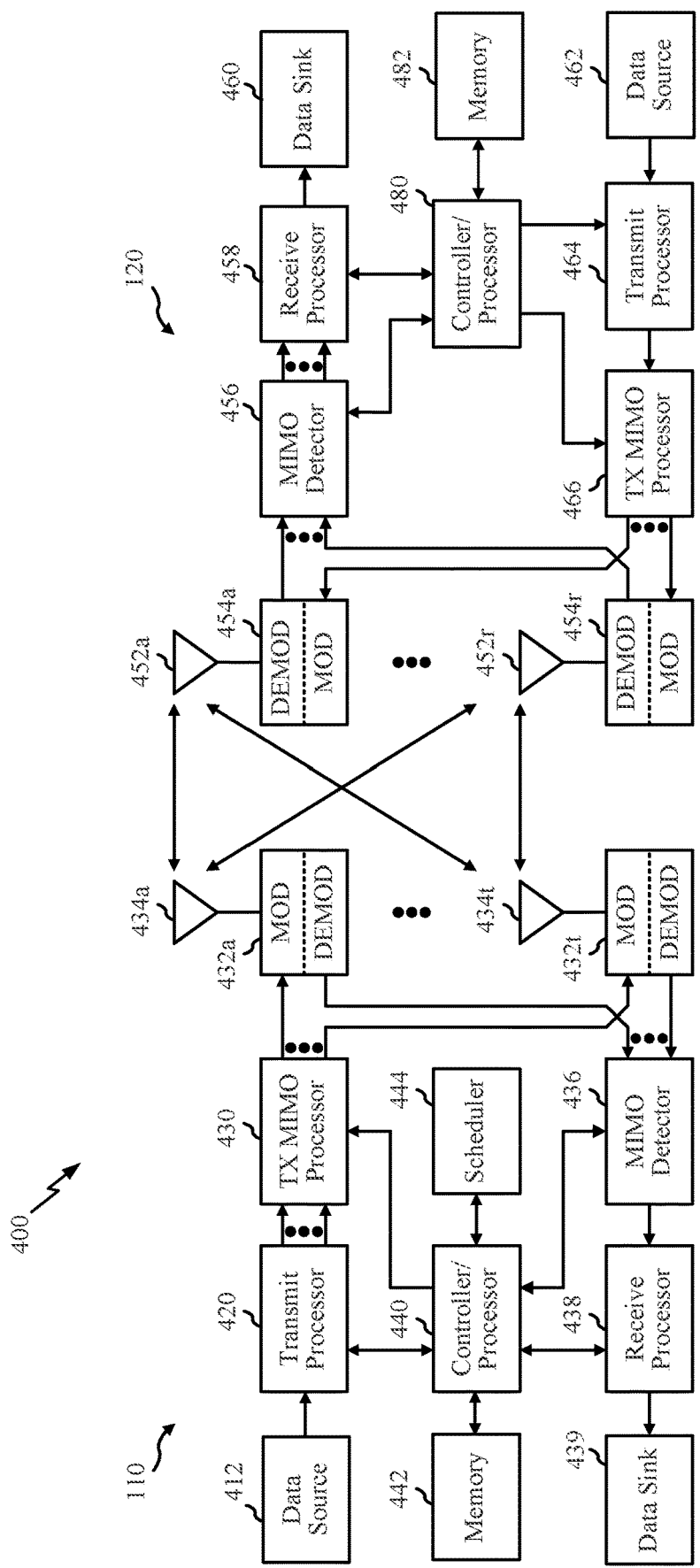
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 may be used to perform operations 800 of FIG. 8, while antennas 434, processors 420, 460, 438, and/or controller/processor 440 of the BS 110 may be used to perform operations 900 of FIG. 9.

At the BS 110, a transmit processor 420 may receive data from a data source 412 and control information from a controller/processor 440. The control information may be for the physical broadcast channel (PBCH), physical control format indicator channel (PCFICH), physical hybrid automatic repeat request (HARQ) indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, antennas 452a through 452r may receive downlink signals from the base station 110 and may provide received signals to demodulators (DEMODs) in transceivers 454a through 454r, respectively. Each demodulator 454 may condition (e.g., filter, amplify, down convert, and digitize) a respective received signal to obtain input samples. Each demodulator may further process input samples (e.g., for OFDM, etc.) to obtain received symbols. A MIMO detector 456 may obtain received symbols from all demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct operations at the base station 110 and the UE 120, respectively. The processor 440 and/or other processors and modules at the BS 110 may perform or direct execution of processes for techniques described herein. The memories 442 and 482 may store data and program codes for BS 110 and UE 120, respectively. A scheduler 444 may schedule UEs for data transmission on the downlink and/or uplink.

Figure 5:
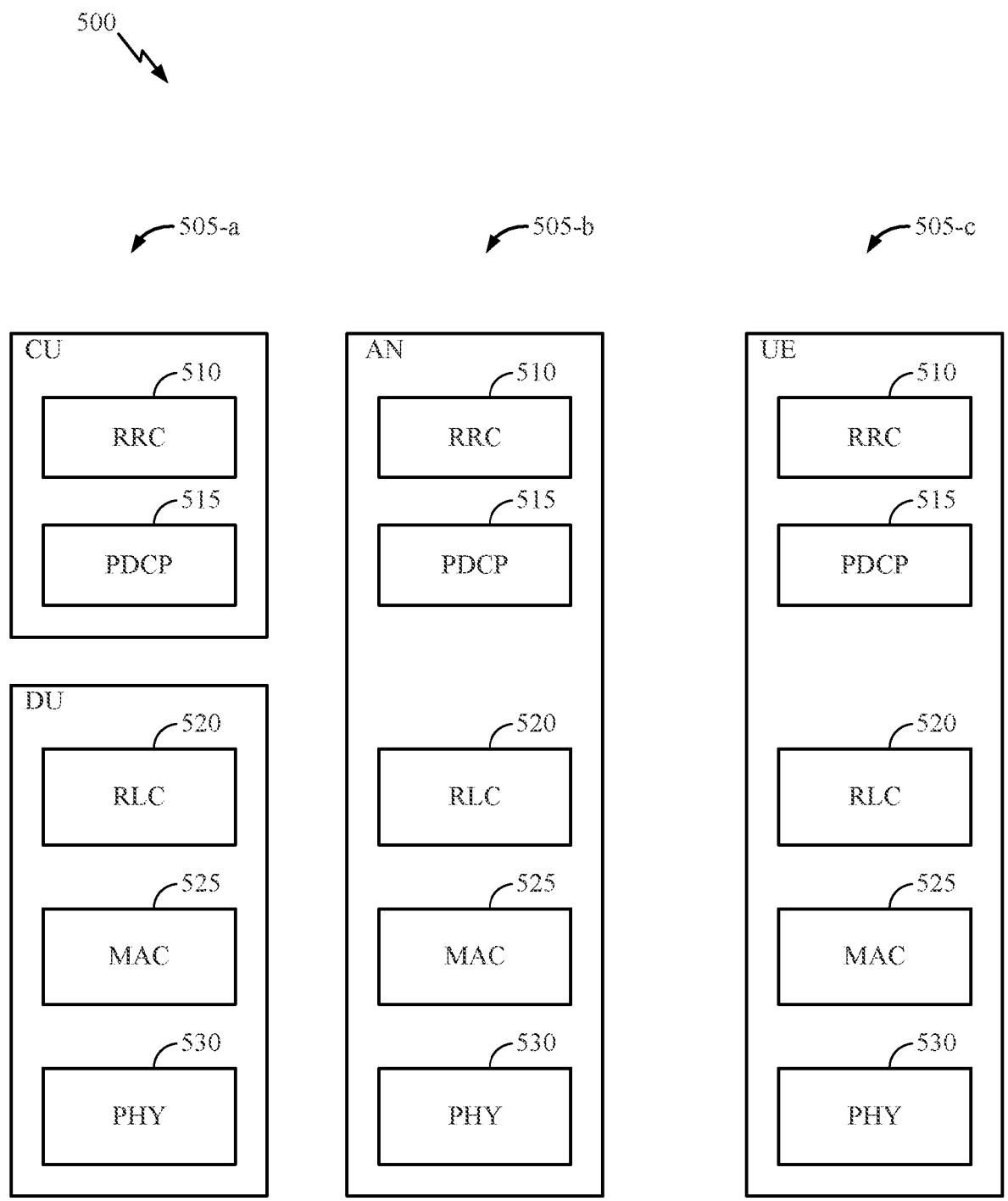
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., TRP 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

Embodiments discussed herein may include a variety of spacing and timing deployments. For example, in LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
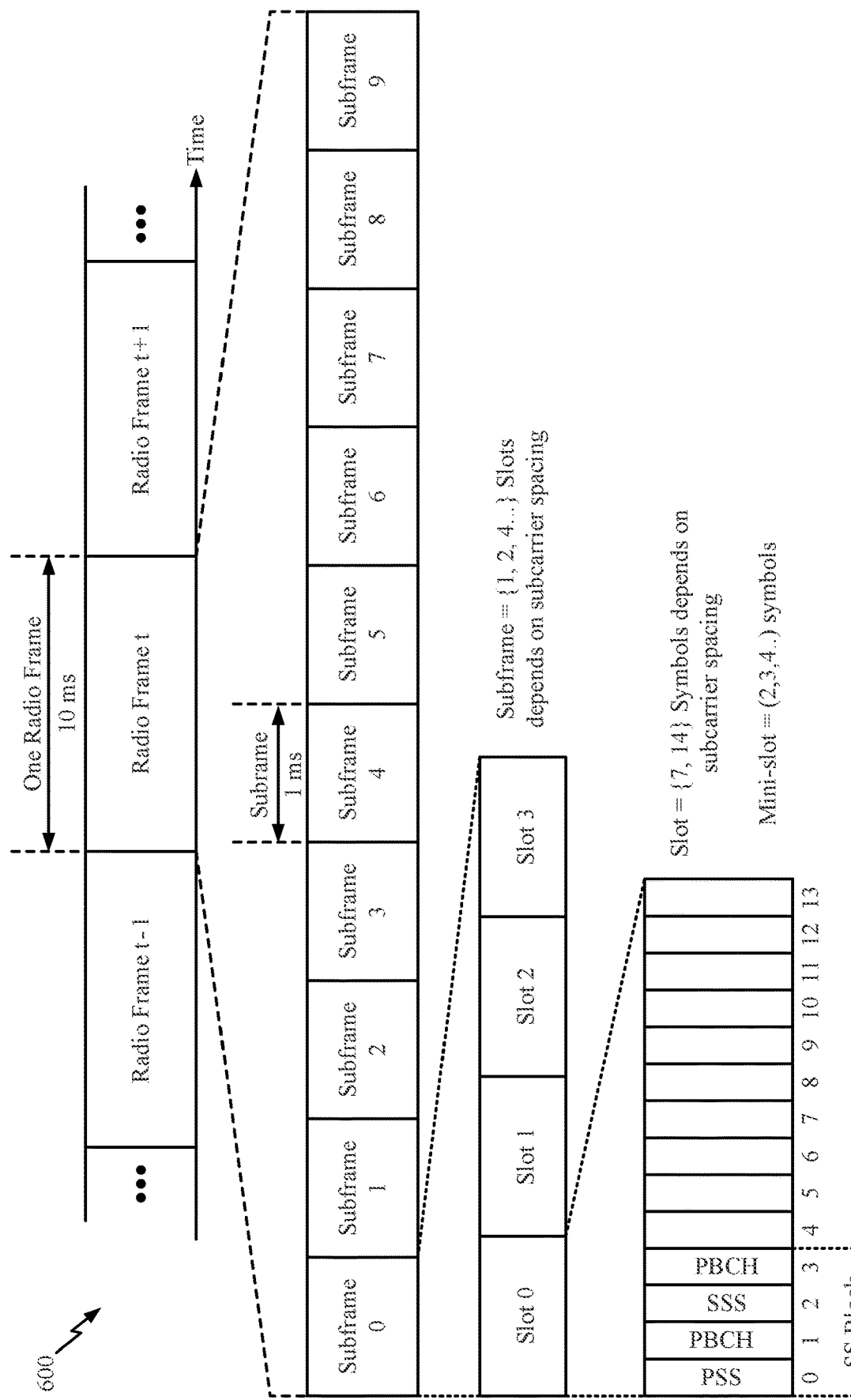
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot is a subslot structure (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block (SSB) is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, and the SS may provide the CP length and frame timing. The PSS and SSS may provide the cell identity. The PBCH carries some basic system information, such as downlink system bandwidth, timing information within radio frame, SS burst set periodicity, system frame number, etc.

Further system information such as, remaining minimum system information (RMSI), system information blocks (SIBs), other system information (OSI) can be transmitted on a physical downlink shared channel (PDSCH) in certain subframes.

Certain deployment scenarios may include one or both NR deployment options. Some may be configured for non-standalone (NSA) and/or standalone (SA) options. A standalone cell may broadcast both SSB and remaining minimum system information (RMSI), for example, with SIB1 and SIB2. A non-standalone cell may only broadcast SSB, without broadcasting RMSI. In a single carrier in NR, multiple SSBs may be sent in different frequencies, and may include the different types of SSB.

Example Monitoring for a Combination Downlink Control Information (DCI) Scheduling Transmissions in Multiple Cells Aspects of the present disclosure provide apparatuses, methods, processing systems, and computer readable mediums for monitoring for combination downlink control information (DCI) that schedules transmissions in multiple cells.

Figure 7:
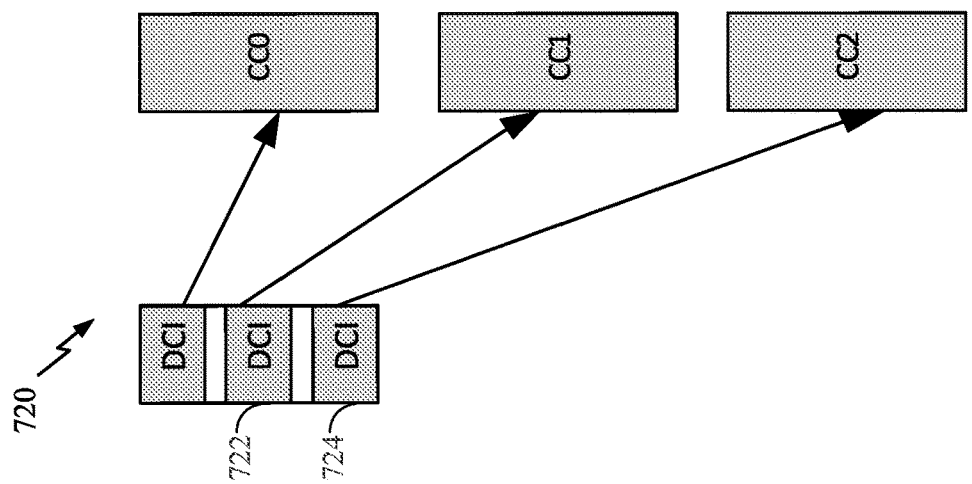
FIG. 7 illustrates an example combination downlink control information (DCI) that schedules transmissions in a plurality of cells, in accordance with certain aspects of the present disclosure.
Figure 7:
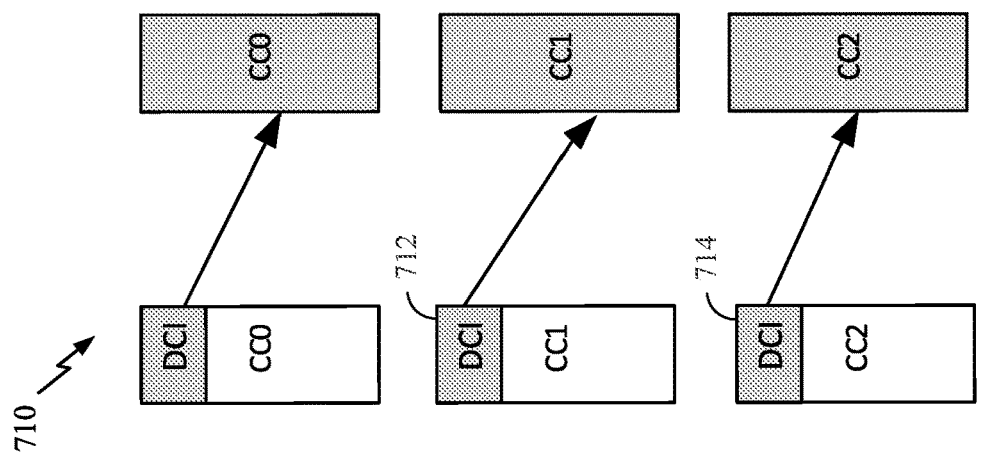
Figure 7:
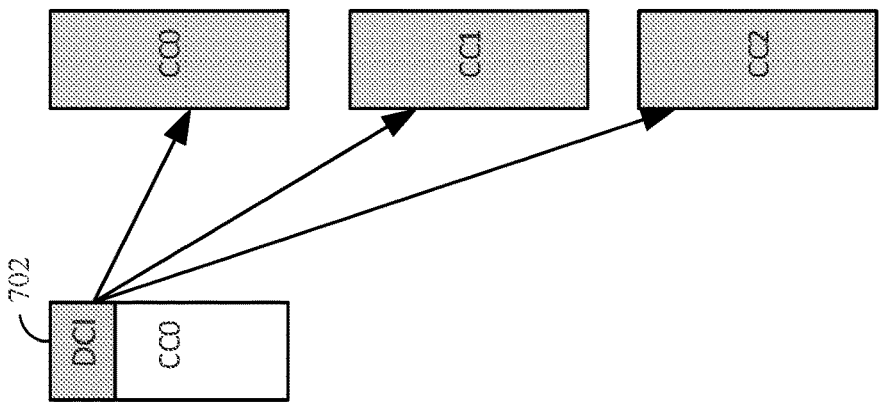

FIG. 7 illustrates an example of a single (combination) DCI used to schedule transmissions in multiple cells. A combination DCI generally refers to a single DCI transmission that has one or more common DCI fields, shared among multiple cells. For example, the common DCI fields of a combination DCI may dynamically schedule UL and/or DL data and/or reference signals in multiple cells. As described herein, the common DCI fields of a combination DCI may also dynamically activate and deactivate frequency resources in multiple cells, for example, via a bandwidth part (BWP) switch to be applied in the multiple cells.

As illustrated, a single (combination) DCI transmitted by a first cell (in component carrier CC0) may schedule data and/or reference signal (RS) transmissions between a UE and multiple cells (in component carriers CC0, CC1, and CC2). For example, DCI 702 may schedule physical downlink shared channel (PDSCH) transmissions, physical uplink shared channel (PUSCH) transmissions, channel state information reference signals (CSI-RSs) transmissions, and sounding reference signals (SRSs) transmissions.

Case 710 illustrates an example in which separate DCIs transmitted on separate component carriers to configure cells operating on the separate component carriers. Case 720 illustrates an example in which cross-carrier scheduling, where separate DCIs are transmitted on one component carrier (i.e., CC0), is used to schedule cells operating on CC0, CC1, and CC2. In both examples 710 and 720, a UE may monitor for DCIs individually for each cell operating on CC0, CC1, and CC2.

However, where a combination DCI (e.g., combination DCI 702) is transmitted by a scheduling cell to configure multiple cells, the blind decode and CCE limits for the scheduled cells may be reduced, as information for the scheduled cells is carried in the combination DCI. For example, if a cell operating on CC0 transmits a combination DCI for cells operating on CC0, CC1, and CC2, the PDCCH limits (e.g., blind decode and CCE limits) may be reduced for the cells other than the cell that transmitted the combination DCI. As illustrated, by using a combination DCI 702, a UE may not need to monitor for DCI 712 transmitted by a cell operating on CC1 or DCI 714 transmitted by a cell operating on CC2, in case 710 and may not need to monitor for DCIs 722 and 724 transmitted by the cell operating on CC0 to configure cells operating on CC1 and CC2 in case 720. The PDCCH limits for the cell that transmitted the combination DCI may not be reduced, however, as that cell still is to decode a DCI. Thus, the parameter calculations described below may be modified to account for monitoring for a combination DCI from a scheduling cell (i.e., the cell that transmitted the combination DCI), and not needing to monitor for individual DCIs for the scheduled cells (i.e., the cells, other than the cell that transmitted the combination DCI, scheduled in the combination DCI).

When compared to a case illustrated by 710 or 720, where individual DCI transmissions are used to schedule transmissions in each cell, whether self-scheduled (each individual DCI is transmitted in the cell it is scheduling) or cross-scheduled (a DCI sent in one cell schedules transmissions in a different cell), a combination DCI can reduce the size of overall PDCCH resources used by sharing some DCI fields scheduling information for the multiple cells. When the DCI 702 schedules PDSCH or PUSCH, the DCI 702 can schedule one transport block (TB) across the multiple cells or can separately schedule multiple TBs in the multiple cells. When CSI-RS or SRS transmissions are triggered, the DCI can trigger one resource across the multiple cells or can separately schedule multiple resources in the multiple cells.

In some cases, a UE may handle a number of blind decodes and a number of non-overlapped control channel elements (CCEs) for PDCCH decoding up to a blind decode and CCE limit over a time duration. The time duration may be, for example, a slot or a PDCCH span with up to a number of OFDM symbols (e.g., three OFDM symbols) when ultra-reliable low-latency communication (URLLC) is configured. When a UE is configured with carrier aggregation, the blind decode limit and CCE limit may be defined for each cell as a per-cell limit or across multiple cells (e.g., all cells associated with the same numerology) as a total limit.

Generally, when one DCI schedules data or reference signal transmission in multiple cells, a single DCI may be decoded in the scheduling cell. No additional DCI decoding, however, may be needed for data and reference signal transmissions scheduled for the other cells. Thus, for the scheduled cells (excluding the scheduling cell), a PDCCH limit (e.g., a blind decode limit and/or CCE limit) may be reduced.

Typically, to determine PDCCH limits, a UE may begin by determining $N_{cells}^{cap}$, which represents a reference number of configured cells. When a UE is not configured with NR dual connectivity (NR-DC) and the UE reports its PDCCH blind decode capability (e.g., pdcch-BlindDetectionCA), $N_{cells}^{cap}$ may be set to the value of the PDCCH blind decode capability. Otherwise, $N_{cells}^{cap}$ may be set to the number of configured downlink cells. If, however, a UE is configured with NR-DC, $N_{cells}^{cap}$ may be determined for each cell group (e.g., master cell group, secondary cell group, etc.). $N_{cells}^{cap}$ may be set to the value of a reference number of cells in each cell group provided by the network (e.g., to pdcch-BlindDetectionMCG for the master cell group and pdcch-BlindDetectionSCG for the secondary cell group).

The UE may then determine the PDCCH blind decode and CCE share of $N_{cells}^{cap}$ for the set of cells having a numerology associated with a numerology factor µ. The UE may proportionally split $N_{cells}^{cap}$ across different sets of cells with different numerology factors µ based on the number of cells associated with the numerology factor µ (i.e., $N_{cells}^{DL,\mu}$), such that the reference number for each set of cells may be represented as $N_{cells}^{cap,\mu}$. In some cases, if cell A with numerology factor $\mu_A$ is scheduled by cell B with numerology factor $\mu_B$, the PDCCH blind decode and CCE limits may be determined for cell A by assuming that the numerology factor for cell A is $\mu_B$.

The UE may determine the total PDCCH blind decode and CCE limits for each set of cells associated with a same numerology factor $\mu$. The total PDCCH blind decode limit, which represents the total number of blind decodes the UE may be expected to process, may be represented by the equation $M_{PDCCH}^{total,slot,\mu} = \lfloor N_{cells}^{cap,\mu} \cdot M_{PDCCH}^{max,slot,\mu} \rfloor$, where $\lfloor \cdot \rfloor$ represents the floor operation (i.e., an operation that rounds down to the nearest integer). The total PDCCH CCE limit, which represents that maximum total number of non-overlapped CCEs the UE may be expected to process, may be represented by the equation $C_{PDCCH}^{total,slot,\mu} = \lfloor N_{cells}^{cap,\mu} \cdot M_{PDCCH}^{max,slot,\mu} \rfloor$. $M_{PDCCH}^{max,slot,\mu}$ may represent a maximum number of monitored PDCCH candidates (e.g., the maximum number of blind decodes) per slot, and $M_{PDCCH}^{max,slot,\mu}$ and $C_{PDCCH}^{max,slot,\mu}$ may represent a maximum number of blind decodes and a maximum number of non-overlapped CCEs per slot for a given numerology factor $\mu$ configured for a bandwidth part (BWP) of a cell used for PDCCH limit determination, as defined in Tables 10.1-2 and 10.1-3 of TS 38.213, Rel. 15, respectively.

The UE may determine per-cell PDCCH blind decode and CCE limits for each cell associated with a numerology factor $\mu$. The maximum number of blind decodes a UE may be expected to process for a scheduled cell with a given numerology factor $\mu$ may be $\min(M_{PDCCH}^{total,slot,\mu}, M_{PDCCH}^{max,slot,\mu})$. The maximum number of non-overlapped CCEs the UE may be expected to process for each scheduled cell with a given numerology factor $\mu$ may be $\min(C_{PDCCH}^{total,slot,\mu}, C_{PDCCH}^{max,slot,\mu})$.

In some cases, where a cell can be scheduled together with other cells with a combination DCI for data and RS transmission, the cell's PDCCH limit for one or more of blind decodes or non-overlapped CCEs may be reduced. Processing the combination DCI may be counted into the PDCCH limit of the scheduling cell, and thus, the PDCCH limit for the scheduling cell may not need to be limited.

Figure 8:
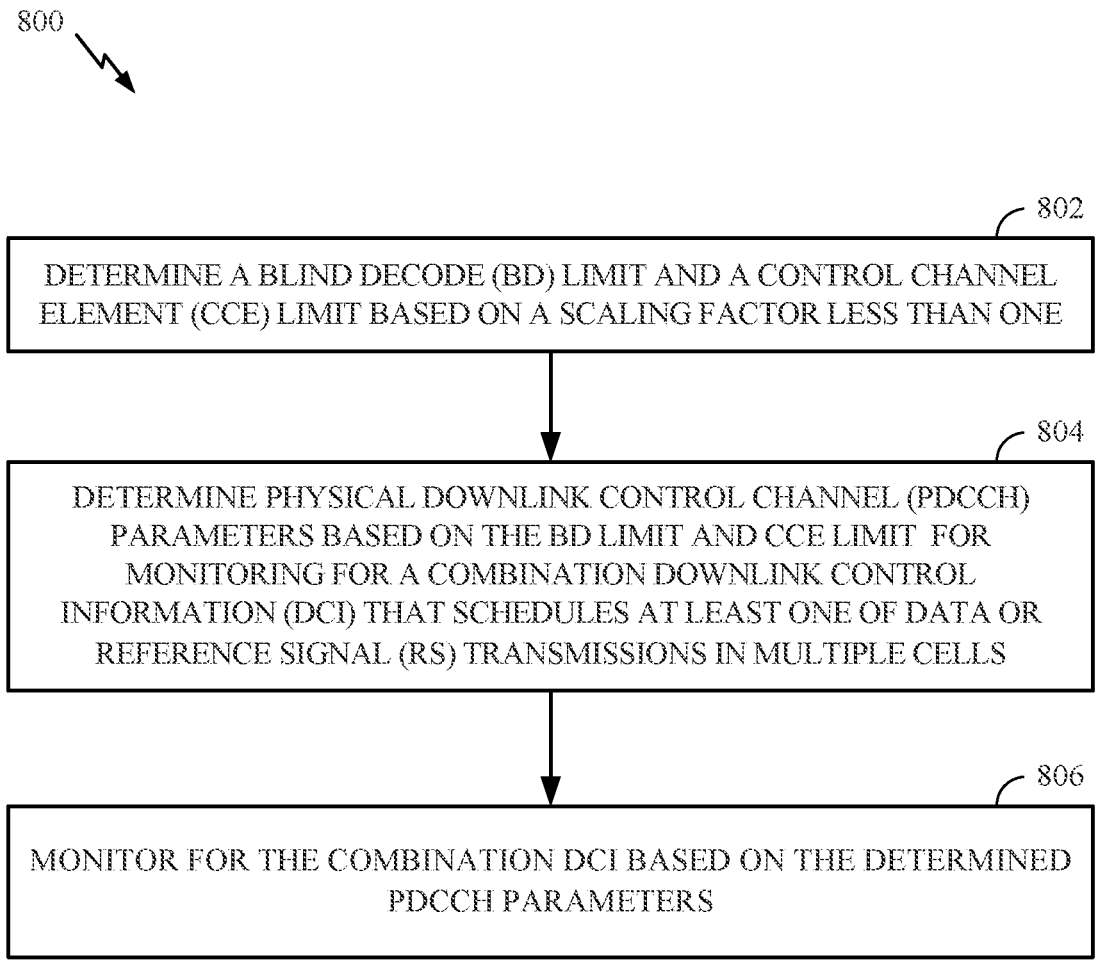
FIG. 8 illustrates example operations for wireless communications by a user equipment (UE), in accordance with certain aspects of the present disclosure.

FIG. 8 illustrates example operations 800 that may be performed by a user equipment to monitor for a combination DCI scheduling data and/or reference signal (RS) transmissions in multiple cells, according to an aspect of the present disclosure. As illustrated, operations 800 begin at 802, where the UE determines a blind decode (BD) limit and a control channel element (CCE) limit based on a scaling factor. The scaling factor may be less than one.

At 804, the UE determines physical downlink control channel (PDCCH) parameters based on the BD limit and the CCE limit for monitoring for a combination DCI that schedules at least one of data or reference signal (RS) transmissions in multiple cells. Means for performing the functionality of 802 and/or 804 may, but not necessarily, include, for example, controller/processor 480, receive processor 458, and/or memory 482, or any combination thereof.

At 806, the UE monitors for the combination DCI based on the determined PDCCH parameters. Means for performing the functionality of 806 may, but not necessarily, include, for example, antenna 452, DEMOD/MOD 454, MIMO detector 456, receive processor 458, controller/processor 480, and/or memory 482, or any combination thereof.

Figure 9:
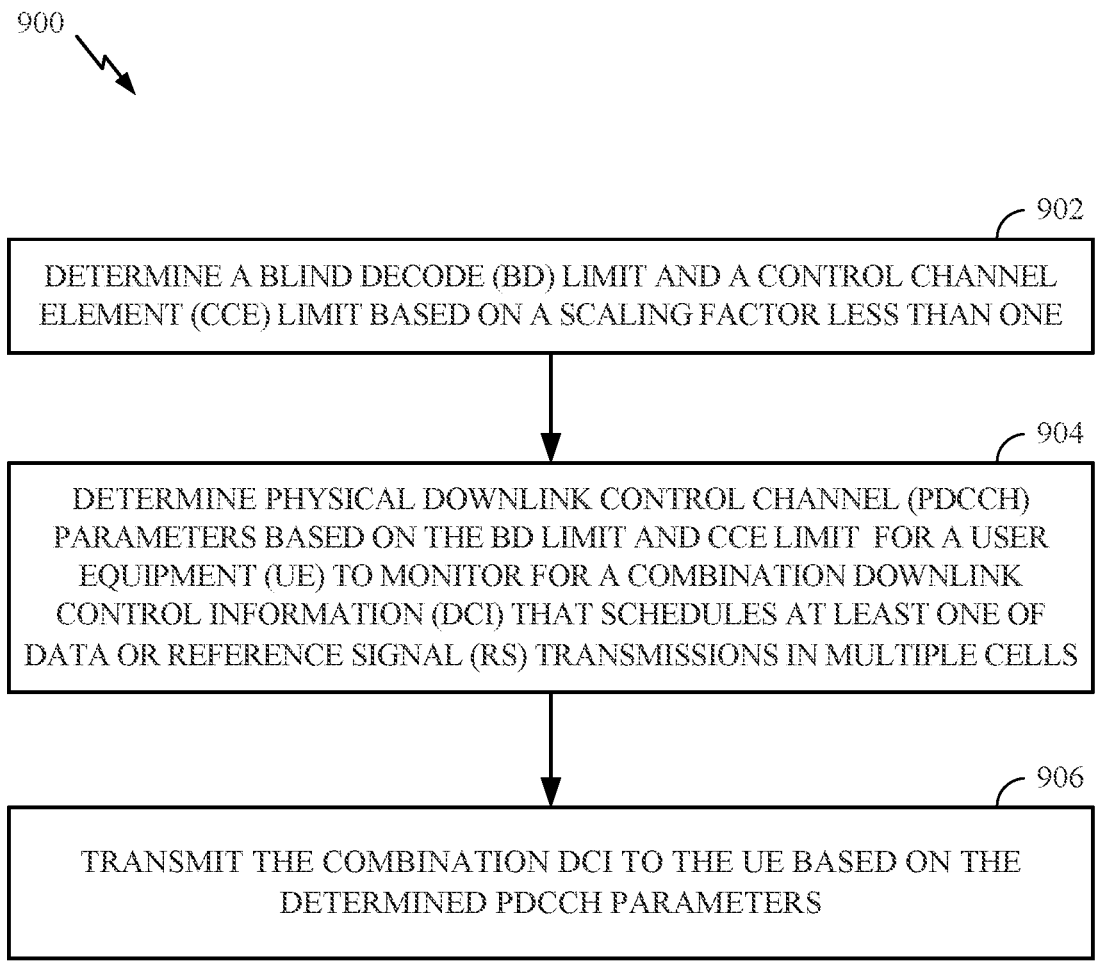
FIG. 9 illustrates example operations for wireless communications by a network entity, in accordance with certain aspects of the present disclosure.

FIG. 9 illustrates example operations 900 that may be performed by a cell to transmit a combination DCI scheduling data and/or reference signal (RS) transmissions in multiple cells, according to an aspect of the present disclosure. As illustrated, operations 900 begin at 902, where the cell determines a blind decode (BD) limit and a control channel element (CCE) limit based on a scaling factor. The scaling factor may be less than one.

At 904, the cell determines physical downlink control channel (PDCCH) parameters based on the BD limit and the CCE limit for a user equipment (UE) to monitor for a combination downlink control information (DCI) that schedules at least one of data or reference signal (RS) transmissions in multiple cells. Means for performing the functionality of 902 and/or 904 may, but not necessarily, include, for example, controller/processor 440, transmit processor 420, and/or memory 442, or any combination thereof.

At 906, the cell transmits a combination DCI based on the determined PDCCH parameters. Means for performing the functionality of 906 may, but not necessarily, include, for example, antenna 434, MOD/DEMOD 432, TX MIMO processor 430, transmit processor 420, controller/processor 440, and/or memory 442, or any combination thereof.

As discussed, where a UE is configured to handle a scenario in which a DCI is used to schedule data and/or reference signal (RS) transmissions in multiple cells, for each of a plurality of carriers, the PDCCH limit per cell can be reduced. The reduction can be based on a scaling factor x, if x is less than 1. The per-cell limit for blind decodes may thus be defined as $\min(M_{PDCCH}^{total,slot,\mu}, x M_{PDCCH}^{max,slot,\mu})$. Likewise, the per-cell limit for CCEs may be defined as $\min(C_{PDCCH}^{total,slot,\mu}, x C_{PDCCH}^{max,slot,\mu})$. In some embodiments, the scaled per-cell limits for blind decodes and non-overlapped CCEs the UE may be expected to process for each cell with a given numerology factor $\mu$ may not apply to the scheduling cell (e.g., the cell that transmits the combination DCI to the UE for scheduling). The scaling factor x may be specified a priori, configured by the network, or reported by the UE (e.g., as a UE capability in capability signaling).

In some embodiments, the scaling factor may be used to calculate total PDCCH limits (including a total BD limit and a total CCE limit) for cells associated with a numerology factor $\mu$. The term $N_{cells}^{DL,\mu}$ in the equations illustrated above may be replaced with the term $N_{cells,1}^{DL,\mu} + x \cdot N_{cells,2}^{DL,\mu}$, where $N_{cells,1}^{DL,\mu}$ represents the number of configured downlink cells associated with numerology factor $\mu$ that are not within or not among the multiple cells that can be configured by a combination DCI, and $N_{cells,2}^{DL,\mu}$ represents the number of configured downlink cells associated with numerology factor $\mu$ that are within or among the multiple cells that can be configured by the combination DCI. The scheduling cells that can transmit the combination DCI may be excluded from $N_{cells,2}^{DL,\mu}$ but included in $N_{cells,1}^{DL,\mu}$.

In some embodiments, if NR-DC is configured for a UE, per-cell blind decode limits and CCE limits may be determined for cells in a master cell group (MCG) and secondary cell group (SCG) separately.

In some embodiments, the UE may report its supported PDCCH blind detection capability (i.e., pdcch-BlindDetectionCA), and the scheduling cell receives the PDCCH blind detection capability from the UE, based on one or more conditions. In one embodiment, when it is possible that the network can configure the UE with M+N downlink cells, where M (the first number) represents a number of downlink cells greater than zero (M≥0) that are not within (or not among) the multiple cells that can be configured by the combination DCI and N (the second number) represents a number of downlink cells greater than zero (N≥0) that are within (or are among) the multiple cells that can be configured by the combination DCI, the one or more conditions are satisfied when M+x·N>4 (or, more generally, where M+x·N>thresholdValue). The scheduling cells within the set of cells that can transmit the combination DCI may be excluded from N but included in M. In some embodiments, where a UE is configured for NR-DC, the UE may report (and the scheduling cell may receive) its supported PDCCH blind detection capability for all downlink cells together across the MCG and SCG.

In some embodiments, where the UE is not configured with NR-DC, the reference number of cells $N_{cells}^{cap}$ may be the value of the supported PDCCH blind detection capability (i.e., pdcch-BlindDetectionCA) if the UE reports (and if the scheduling cell receives) the supported PDCCH blind detection capability.

In some embodiments, when the UE is not configured with NR-DC and the UE does not report the supported PDCCH blind detection capability (i.e., pdcch-BlindDetectionCA), the value of $N_{cells}^{cap}$ may be m+x·n, where m is the number of configured downlink cells that are not within or not among the multiple cells that can be configured by the combination DCI, and n is the number of configured DL cells within or among the multiple cells that can be configured by the combination DCI. The scheduling cell(s) within the multiple cells that can transmit the combination DCI may be excluded from in but included in m.

If the scaling factor is 1, a UE may use a legacy technique, discussed above, for identifying blind decode and CCE limits for a cell. For example, a per-cell limit for blind decodes may be represented by the equation $\min(M_{PDCCH}^{total,slot,\mu}, M_{PDCCH}^{max,slot,\mu})$, and the per-cell CCE limit may be represented by the equation $\min(C_{PDCCH}^{total,slot,\mu}, C_{PDCCH}^{max,slot,\mu})$.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium such as, for example, memory 442 or memory 482 (with reference to FIG. 4) having instructions stored (and/or encoded) thereon, the instructions being executable by one or more processors (such as transmit processor 420, controller/processor 440, and/or receive processor 438 and/or receive processor 458, controller/processor 480, and/or transmit processor 464 with reference to FIG. 4) to perform the operations described herein. Such instructions can include, for example, instructions that, when executed, cause or instruct the one or more processors to perform the operations described herein and illustrated in FIGS. 9-10.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
   determining a blind decode (BD) limit and a control channel element (CCE) limit based on a scaling factor less than one, wherein the scaling factor comprises a value that is reported by the UE to a cell as a UE capability;
   determining physical downlink control channel (PDCCH) parameters based on the BD limit and the CCE limit for monitoring for a combination downlink control information (DCI) that schedules at least one of data or reference signal (RS) transmissions in multiple cells;
   reporting, to a cell of the multiple cells, a supported physical downlink control channel (PDCCH) blind detection capability based on one or more conditions being satisfied, wherein the one or more conditions are satisfied when a sum of a first number of cells with which the UE may be configured and a second number of cells with which the UE may be configured scaled by the scaling factor exceeds a threshold value, wherein the first number represents a number of cells not among the multiple cells configured by the combination DCI and the second number represents a number of cells among the multiple cells configured by the combination DCI; and
   monitoring for the combination DCI based on the determined PDCCH parameters.

2. The method of claim 1, wherein determining the BD limit and the CCE limit is further based on a numerology factor associated with each of the multiple cells.

3. The method of claim 2, wherein the BD limit is a per-cell BD limit representing a maximum number of BDs to perform for each of the one or more cells and the CCE limit is a per-cell CCE limit representing a maximum number of CCEs to decode for each of the one or more cells.

4. The method of claim 1, wherein the BD limit is a total BD limit and the CCE limit is a total CCE limit, and wherein determining the total BD limit and the total CCE limit is further based on:
- a number of cells associated with a numerology factor that are not among the multiple cells configured by the combination DCI, and
- a number of cells associated with the numerology factor that are among the multiple cells configured by the combination DCI scaled by the scaling factor.

5. The method of claim 1, wherein a reference number of cells is equal to a number of cells reported in the supported PDCCH blind detection capability if the UE is not configured with dual connectivity.

6. The method of claim 1, wherein a reference number of cells is based on a first number of configured downlink cells that are not among the multiple cells configured by the DCI and a second number of configured downlink cells that are among the multiple cells configured by the DCI scaled based on the scaling factor, if the UE is not configured with dual connectivity and does not report a supported physical downlink control channel (PDCCH) blind detection capability to a scheduling cell.

7. A method for wireless communications by a base station, comprising:
- determining a blind decode (BD) limit and a control channel element (CCE) limit based on a scaling factor less than one, wherein the scaling factor comprises a value that is reported by a user equipment (UE) to a cell as a UE capability;
- determining physical downlink control channel (PDCCH) parameters based on the BD limit and the CCE limit for a user equipment (UE) to monitor a combination downlink control information (DCI) that schedules at least one of data or reference signal (RS) transmissions in multiple cells;
- receiving, from the UE, a supported physical downlink control channel (PDCCH) blind detection capability based on one or more conditions being satisfied, wherein the one or more conditions are satisfied when a sum of a first number of cells with which the UE may be configured and a second number of cells with which the UE may be configured scaled by the scaling factor exceeds a threshold value, wherein the first number represents a number of cells not among the multiple cells configured by the combination DCI and the second number represents a number of cells among the multiple cells configured by the combination DCI; and
- transmitting, to the UE, the combination DCI based on the determined PDCCH parameters.

8. The method of claim 7, wherein determining the BD limit and the CCE limit is further based on a numerology factor associated with each of the multiple cells.

9. The method of claim 8, wherein the BD limit is a per-cell BD limit representing a maximum number of BDs to perform for each of the multiple cells and the CCE limit is a per-cell CCE limit representing a maximum number of CCEs to decode for each of the multiple cells.

10. The method of claim 7, wherein the BD limit is a total BD limit and the CCE limit is a total CCE limit, and wherein determining the total BD limit and the total CCE limit is further based on:
- a number of cells associated with a numerology factor that are not among the multiple cells configured by the combination DCI, and
- a number of cells associated with the numerology factor that are among the multiple cells configured by the combination DCI scaled by the scaling factor.

11. The method of claim 7, wherein a reference number of cells is equal to a number of cells reported in the supported PDCCH blind detection capability if the UE is not configured with dual connectivity.

12. The method of claim 7, wherein a reference number of cells is based on a first number of configured downlink cells that are not among the multiple cells configured by the DCI and a second number of configured downlink cells that are among the multiple cells configured by the DCI scaled based on the scaling factor, if the UE is not configured with dual connectivity and does not report a supported physical downlink control channel (PDCCH) blind detection capability to a scheduling cell.

13. An apparatus for wireless communications by a user equipment (UE), comprising:
- a memory; and
- a processor configured to:
    - determine a blind decode (BD) limit and a control channel element (CCE) limit based on a scaling factor less than one, wherein the scaling factor comprises a value that is reported by the UE to a cell as a UE capability;
    - determine physical downlink control channel (PDCCH) parameters based on the BD limit and the CCE limit for monitoring a combination downlink control information (DCI) that schedules at least one of data or reference signal (RS) transmissions in multiple cells;
    - report, to a cell of the multiple cells, a supported physical downlink control channel (PDCCH) blind detection capability based on one or more conditions being satisfied, wherein the one or more conditions are satisfied when a sum of a first number of cells with which the UE may be configured and a second number of cells with which the UE may be configured scaled by the scaling factor exceeds a threshold value, wherein the first number represents a number of cells not among the multiple cells configured by the combination DCI and the second number represents a number of cells among the multiple cells configured by the combination DCI; and
    - monitor for the combination DCI based on the determined PDCCH parameters.

14. The apparatus of claim 13, wherein the processor is configured to determine the BD limit and the CCE limit further based on a numerology factor associated with each of the multiple cells, wherein
- the BD limit is a per-cell BD limit representing a maximum number of BDs to perform for each of the one or more cells, and
- the CCE limit is a per-cell CCE limit representing a maximum number of CCEs to decode for each of the one or more cells.

15. The apparatus of claim 13, wherein the BD limit is a total BD limit and the CCE limit is a total CCE limit, and wherein the processor is configured to determine the total BD limit and the total CCE limit further based on:

a number of cells associated with a numerology factor that are not among the multiple cells configured by the DCI, and a number of cells associated with the numerology factor that are among the multiple cells configured by the DCI scaled by the scaling factor.

16. The apparatus of claim 13, wherein a reference number of cells is equal to a number of cells reported in the supported PDCCH blind detection capability if the UE is not configured with dual connectivity.

17. The apparatus of claim 13, wherein a reference number of cells is based on a first number of configured downlink cells that are not among the multiple cells configured by the DCI and a second number of configured downlink cells that are among the multiple cells configured by the DCI scaled based on the scaling factor, if the UE is not configured with dual connectivity and does not report a supported physical downlink control channel (PDCCH) blind detection capability to a scheduling cell.

18. An apparatus for wireless communications by a base station, comprising:
a memory; and
a processor configured to:
determine a blind decode (BD) limit and a control channel element (CCE) limit based on a scaling factor less than one, wherein the scaling factor comprises a value that is reported by a user equipment (UE) to a cell as a UE capability
determine physical downlink control channel (PDCCH) parameters based on the BD limit and the CCE limit for a user equipment (UE) to monitor a combination downlink control information (DCI) that schedules at least one of data or reference signal (RS) transmissions in multiple cells;
receive, from the UE, a supported physical downlink control channel (PDCCH) blind detection capability based on one or more conditions being satisfied, wherein the one or more conditions are satisfied when a sum of a first number of cells with which the UE may be configured and a second number of cells with which the UE may be configured scaled by the scaling factor exceeds a threshold value, wherein the first number represents a number of cells not among the multiple cells configured by the combination DCI and the second number represents a number of cells among the multiple cells configured by the combination DCI; and
transmitting, to the UE, the combination DCI based on the determined PDCCH parameters.

19. The apparatus of claim 18, wherein the processor is configured to determine the BD limit and the CCE limit further based on a numerology factor associated with each of the multiple cells, wherein
the BD limit is a per-cell BD limit representing a maximum number of BDs to perform for each of the one or more cells, and
the CCE limit is a per-cell CCE limit representing a maximum number of CCEs to decode for each of the one or more cells.

20. The apparatus of claim 18, wherein the BD limit is a total BD limit and the CCE limit is a total CCE limit, wherein the processor is configured to determine the total BD limit and the total CCE limit is based on:
a number of cells associated with a numerology factor that are not among the multiple cells configured by the DCI, and
a number of cells associated with the numerology factor that are among the multiple cells configured by the DCI scaled by the scaling factor.

21. The apparatus of claim 18, wherein a reference number of cells is equal to a number of cells reported in the supported PDCCH blind detection capability if the UE is not configured with dual connectivity.

22. The apparatus of claim 18, wherein a reference number of cells is based on a first number of configured downlink cells that are not among the multiple cells configured by the DCI and a second number of configured downlink cells that are among the multiple cells configured by the DCI scaled based on the scaling factor, if the UE is not configured with dual connectivity and does not report a supported physical downlink control channel (PDCCH) blind detection capability to a scheduling cell.

23. An apparatus for wireless communications by a user equipment (UE), comprising:
means for determining a blind decode (BD) limit and a control channel element (CCE) limit based on a scaling factor less than one, wherein the scaling factor comprises a value that is reported by the UE to a cell as a UE capability;
means for determining physical downlink control channel (PDCCH) parameters based on the BD limit and the CCE limit for monitoring for a combination downlink control information (DCI) that schedules at least one of data or reference signal (RS) transmissions in multiple cells;
means for reporting, to a cell of the multiple cells, a supported physical downlink control channel (PDCCH) blind detection capability based on one or more conditions being satisfied, wherein the one or more conditions are satisfied when a sum of a first number of cells with which the UE may be configured and a second number of cells with which the UE may be configured scaled by the scaling factor exceeds a threshold value, wherein the first number represents a number of cells not among the multiple cells configured by the combination DCI and the second number represents a number of cells among the multiple cells configured by the combination DCI; and
means for monitoring for the combination DCI based on the determined PDCCH parameters.

* * * * *